(No Model.)  2 Sheets—Sheet 1.
C. T. STAGG, Jr.
GLASS SIGN.

No. 549,337.  Patented Nov. 5, 1895.

WITNESSES:
Edw. A. Barron
W. Hyer

INVENTOR
Charles T. Stagg Jr.
BY
Pumphrey Johnson & Hincken
ATTORNEYS (No Model.) 2 Sheets—Sheet 2.

C. T. STAGG, Jr.
GLASS SIGN.

No. 549,337. Patented Nov. 5, 1895.

WITNESSES:
Geo. A. Barron
H. S. Johns

INVENTOR
Charles T. Stagg Jr.
By Pumphrey, Johnson & Hincken
his Attorneys

UNITED STATES PATENT OFFICE.

CHARLES T. STAGG, JR., OF PHILADELPHIA, PENNSYLVANIA.

GLASS SIGN.

SPECIFICATION forming part of Letters Patent No. 549,337, dated November 5, 1895.

Application filed February 12, 1895. Serial No. 538,095. (No model.)

*To all whom it may concern:*

Be it known that I, CHARLES T. STAGG, Jr., a citizen of the United States, residing at Philadelphia, in the county of Philadelphia and State of Pennsylvania, have invented a new and useful Improvement in Glass Signs; and I do hereby declare the following to be a full, clear, and exact description of the invention, such as will enable others skilled in the art to which it appertains to make and use the same.

The invention relates to signs.

The object is to secure at a minimum cost such brilliant effect in signs as to give them marked prominence and render them highly attractive.

With this object in view the invention consists in certain novel features and an arrangement of parts hereinafter fully described and claimed.

Figure 1:
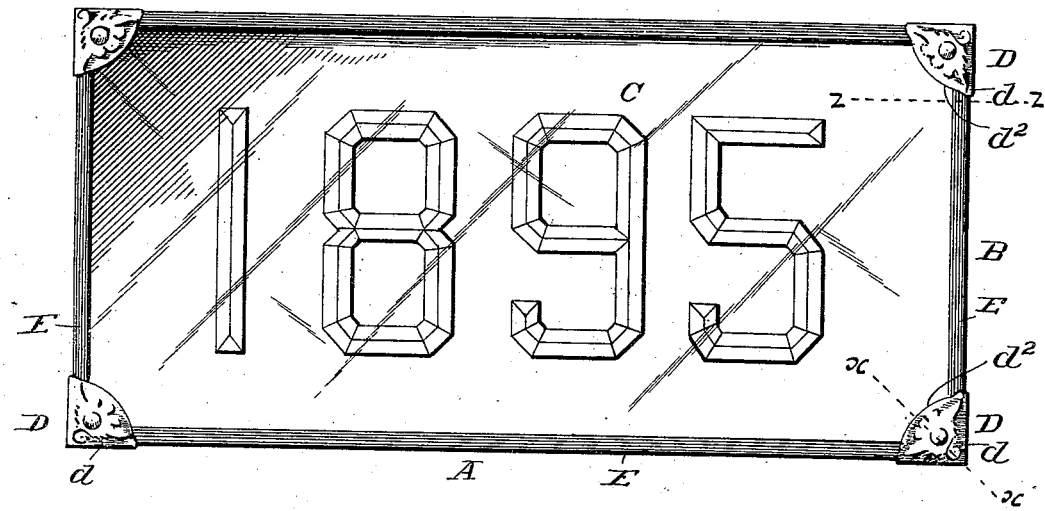
Figure 2:
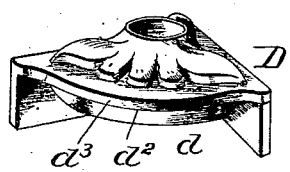
Figure 3:
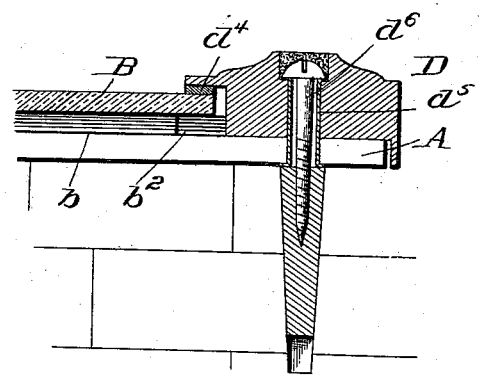
Figure 9:
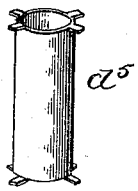
Figure 10:
Figure 11:
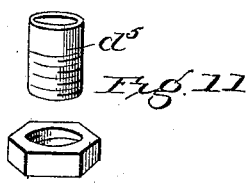
Figure 4:
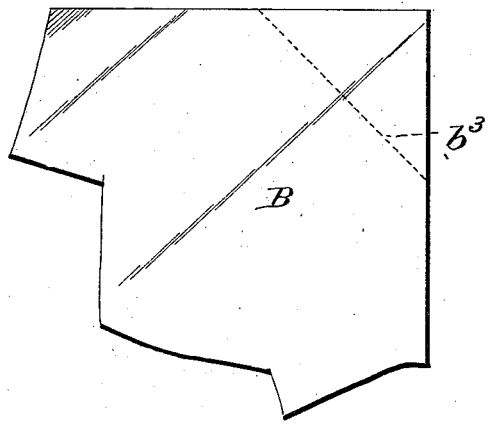
Figure 5:
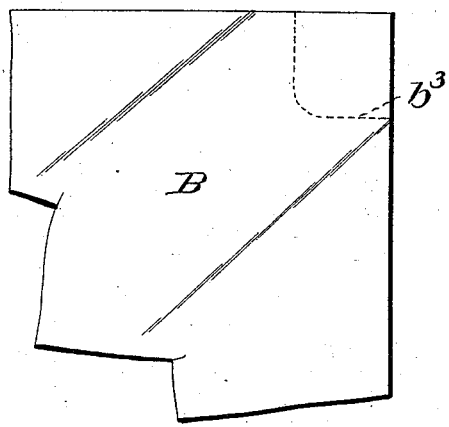
Figure 6:
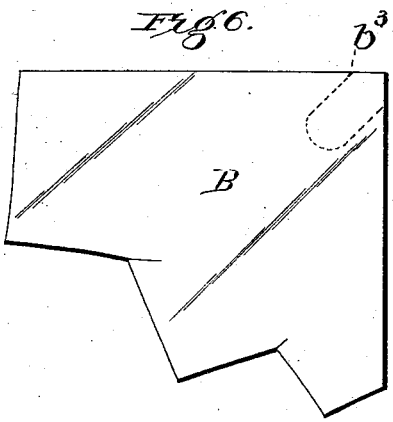
Figure 7:
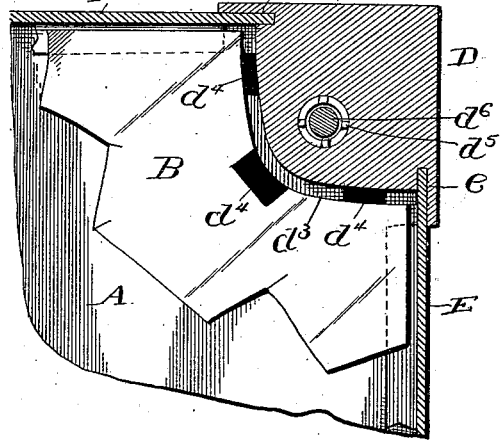
Figure 8:
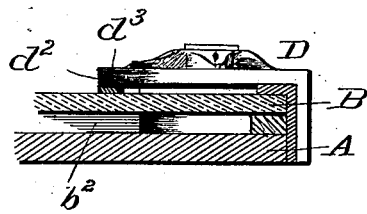

In the accompanying drawings, forming part of this specification, in which similar letters of reference indicate corresponding parts in the several views, Figure 1 is a view in elevation of one embodiment of the invention. Fig. 2 is a view in perspective of one of the corner castings. Fig. 3 is a view in section of the same, taken on the line $x\,x$ of Fig. 1. Figs. 4, 5, and 6 are views in detail showing the manner of recessing the glass. Fig. 7 is a view in horizontal section taken on the line $y\,y$ of Fig. 8. Fig. 8 is a view in vertical section taken on the line $z\,z$ of Fig. 1. Figs. 9 and 10 are views in detail of the fastenings. Fig. 11 is a detail view in perspective of a modified form of fastening.

In the drawings, A represents a base-plate, which is preferably of slate, though other material may be used, if desired.

B represents the letter-holding plate, of glass or other transparent material, upon which the letters are secured in any well-known manner—as, for example, by being cemented. This plate is placed over the slate base and rests upon an interposed frame $b$, lying at or near the outer edge thereof, the inclosed space $b^2$ being sufficient to accommodate the letters forming the sign, which are arranged upon the inner face of the plate. To avoid the expense and risk of drilling the letter-holding plate, it is recessed or cut away at the corners, as shown in Figs. 4, 5, and 6, to form retaining notches $b^3$.

C represents the letters forming the sign. These letters are preferably of glass and triangular in cross-section. It is well known that burnishing is not necessary where gold-leaf is placed upon the glass, since the greatest possible brilliancy is obtained, and therefore by the use of glass letters of triangular cross-section, gilded upon two adjoining sides and fixed by having the remaining plain side cemented to the glass letter-holding plate, many advantages are secured at a comparatively low cost.

D represents the fastenings by which the upper and lower plates are connected and secured in position. At the corner of the plates a casting $d$, of metal, porcelain, or glass, is placed, its main portion being approximately triangular and having one side $b^2$ more or less rounded and provided with a projecting flange $d^3$. This rounded side is designed to enter the notch or recess at the corner of the letter-holding plate, with the flange overlapping the adjacent edge thereof. To prevent undue strain upon the glass plate, small blocks of rubber $d^4$ are interposed between the casting and the plate, as is clearly shown in Fig. 7. Through coincident openings of the castings and base-plate a tubular fastening $d^5$ is inserted and serves to connect the parts by having its ends split and turned out against the under side of the base and an annular shoulder within the opening of the casting. Through these tubular fastenings screws $d^6$ are inserted and adapted to enter plugged sockets in the wall of the building to which a sign is to be attached.

E represents marginal or angle strips which are L-shaped in cross-section and are secured, overlapping the edges of the plates, by entering recesses $e$ in the corner castings.

The modification illustrated in Fig. 11 consists in threading the lower end of the tubular fastenings to receive a nut, which may be employed, if desired, instead of splitting the end of the tube and turning portions outward, as above described. It will thus be seen that the gilded letters will be fully protected against moisture and their brilliancy maintained indefinitely.

The many advantages of the invention will be obvious from the foregoing description.

Having thus fully described my invention, what I claim as new is—

1. In a sign of the class described, a transparent letter-holding plate having its corners notched, a baseplate, castings having portions entering the notches of the transparent plate and flanges overlapping the adjacent edges thereof, and means for connecting and securing the parts, for the purpose specified.

2. In a sign of the class described, a transparent letter-holding plate recessed at the corners, a base plate, castings having portions seated in the recesses and flanges overlapping the adjacent edges of the plate, interposed cushions between the flanges and the plate and tubular fastenings adapted to be inserted and secured in co-incident apertures of the castings and base plate in a manner to connect the same, for the purpose described.

3. The combination with a notched letter-holding plate having one or more letters of angular cross section fixed thereon, of a base plate, castings having portions entering the notches of the transparent plate and flanges overlapping the adjacent edges thereof, and means for connecting and securing the parts, for the purpose specified.

In testimony whereof I have signed this specification in the presence of two subscribing witnesses.

CHARLES T. STAGG, JR.

Witnesses:
STEPHEN McGINLEY,
MICHAEL J. RYAN.